(12) United States Patent
Clark et al.

(10) Patent No.: US 7,673,086 B2
(45) Date of Patent: Mar. 2, 2010

(54) RETRIEVING LOCK ATTENTION DATA USING AN ATTENTION CONNECTION PATH SELECTED FROM A GROUP OF ATTENTION CONNECTION PATHS ASSOCIATED WITH A HOST

(75) Inventors: Brian Dow Clark, Tucson, AZ (US); Juan Alonso Coronado, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 11/840,850

(22) Filed: Aug. 17, 2007

(65) Prior Publication Data

US 2009/0049218 A1 Feb. 19, 2009

(51) Int. Cl.
*G06F 12/14* (2006.01)
(52) U.S. Cl. .................. 710/200; 710/243; 710/269
(58) Field of Classification Search ............. 710/36–39, 710/200, 220, 238–239, 310, 312, 316–317, 710/8–14, 104, 109, 260–269
See application file for complete search history.

(56) References Cited

U.S. PATENT DOCUMENTS

| | | | | |
|---|---|---|---|---|
| 4,716,528 A | * | 12/1987 | Crus et al. ................. | 710/200 |
| 5,161,227 A | * | 11/1992 | Dias et al. .................. | 718/104 |
| 5,485,607 A | * | 1/1996 | Lomet et al. ................. | 707/8 |
| 5,551,046 A | * | 8/1996 | Mohan et al. ................. | 707/8 |
| 6,145,028 A | | 11/2000 | Shank et al. | |
| 6,253,274 B1 | * | 6/2001 | Boonie et al. ............... | 710/200 |
| 6,629,148 B1 | * | 9/2003 | Ahmed et al. ............... | 709/238 |
| 6,983,330 B1 | * | 1/2006 | Oliveira et al. ............. | 709/239 |
| 7,127,545 B1 | * | 10/2006 | Nandi et al. ................ | 710/316 |
| 7,133,929 B1 | | 11/2006 | Shah | |
| 2005/0102457 A1 | * | 5/2005 | Stultz ........................ | 710/260 |
| 2006/0036782 A1 | | 2/2006 | Peterson et al. | |
| 2006/0036790 A1 | | 2/2006 | Peterson et al. | |
| 2006/0106823 A1 | | 5/2006 | Clark et al. | |
| 2006/0106964 A1 | | 5/2006 | Clark et al. | |

* cited by examiner

*Primary Examiner*—Raymond N Phan
(74) *Attorney, Agent, or Firm*—Janaki K. Davda; Konrad Raynes & Victor LLP

(57) ABSTRACT

Provided are techniques for retrieving lock attention data. A group of attention connection paths configured to transmit lock attention interrupts and lock attention data between the host and the control unit are identified. A lock attention interrupt is received from the control unit. In response to receiving the lock attention interrupt, a connection path from the group of attention connection paths is selected and lock attention data is retrieved from the control unit using the selected connection path.

20 Claims, 7 Drawing Sheets

RETRIEVING LOCK ATTENTION DATA USING AN ATTENTION CONNECTION PATH SELECTED FROM A GROUP OF ATTENTION CONNECTION PATHS ASSOCIATED WITH A HOST

BACKGROUND

1. Field

Embodiments of the invention relate to selection of a connection path for retrieving lock attention data from a group of attention connection paths.

2. Description of the Related Art

A transaction processing system such as an airline reservation system, a hotel reservation system, a credit card transaction processing system, an automatic teller machine system, other banking systems, or the like typically comprises a plurality of host systems or hosts such as mainframe computers, servers, and the like. The hosts access data in a common data storage location. The data store typically includes a plurality of storage devices such as hard disk drives, data caches, and the like. The hosts may access the data in the storage devices through a control unit. For example, a first host may request data from the control unit, and the control unit may retrieve the data from one or more storage devices. The first host may also transmit data to the control unit, and the control unit may write the data to one or more storage devices.

Each host communicates with the control unit through a channel path. Each channel path typically includes one or more physical communication channels such as a digital electronic communication bus, a digital optical communication bus, or a similar communication channel. In addition, each channel path may include one or more logical control blocks, addresses, communication devices, digital switches, and the like for coordinating the transmission of digital messages between the host and the control unit.

Before the first host accesses data through the control unit, the first host typically requests that the data be locked. For example, the first host may request that specified data such as one or more rows in a data table, one or more tracks of a hard disk drive, or the like be locked. If the first host is granted the lock, the first host may access the specified data without a second host being allowed access the specified data. The first host has exclusive access to the specified data until the first host releases the lock. For transactions such as airline reservations, credit card transactions, or similar transactions, a locking function is designed to allow a transaction with a first host to be completed before a second host can access the transaction data.

If the second host requests a lock on the specified data while the first host holds the lock on the specified data, the second host will be not receive the lock and will become a waiter. Instead the second host's lock request will be placed in a lock request queue. The second host may wait to process transactions until receiving the lock. After the first host has released the lock on the data, the control unit grants the next lock request in the lock request queue for the specified data. For example, after the first host releases the lock, the control unit may grant a lock on the specified data to the second host if the second host's request is the next request in the lock request queue. The control unit notifies the second host that the lock has been released by transmitting lock attention data. In this scenario, the lock attention data may take on different forms depending on the status of the lock. The lock attention data may provide information that the lock has been granted or may provide a lock contention message. The lock attention data may provide lock status information. One skilled in the art will recognize other appropriate lock attention data. Upon receipt of the lock attention data granting the lock, the second host may access the specified data.

Notwithstanding current techniques for enabling a host to access lock attention data, there is a need in the art for providing improved access.

SUMMARY OF EMBODIMENTS OF THE INVENTION

Provided are a method, computer program product, and system for retrieving lock attention data. A group of attention connection paths configured to transmit lock attention interrupts and lock attention data between the host and the control unit are identified. A lock attention interrupt is received from the control unit. In response to receiving the lock attention interrupt, a connection path from the group of attention connection paths is selected and lock attention data is retrieved from the control unit using the selected connection path.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
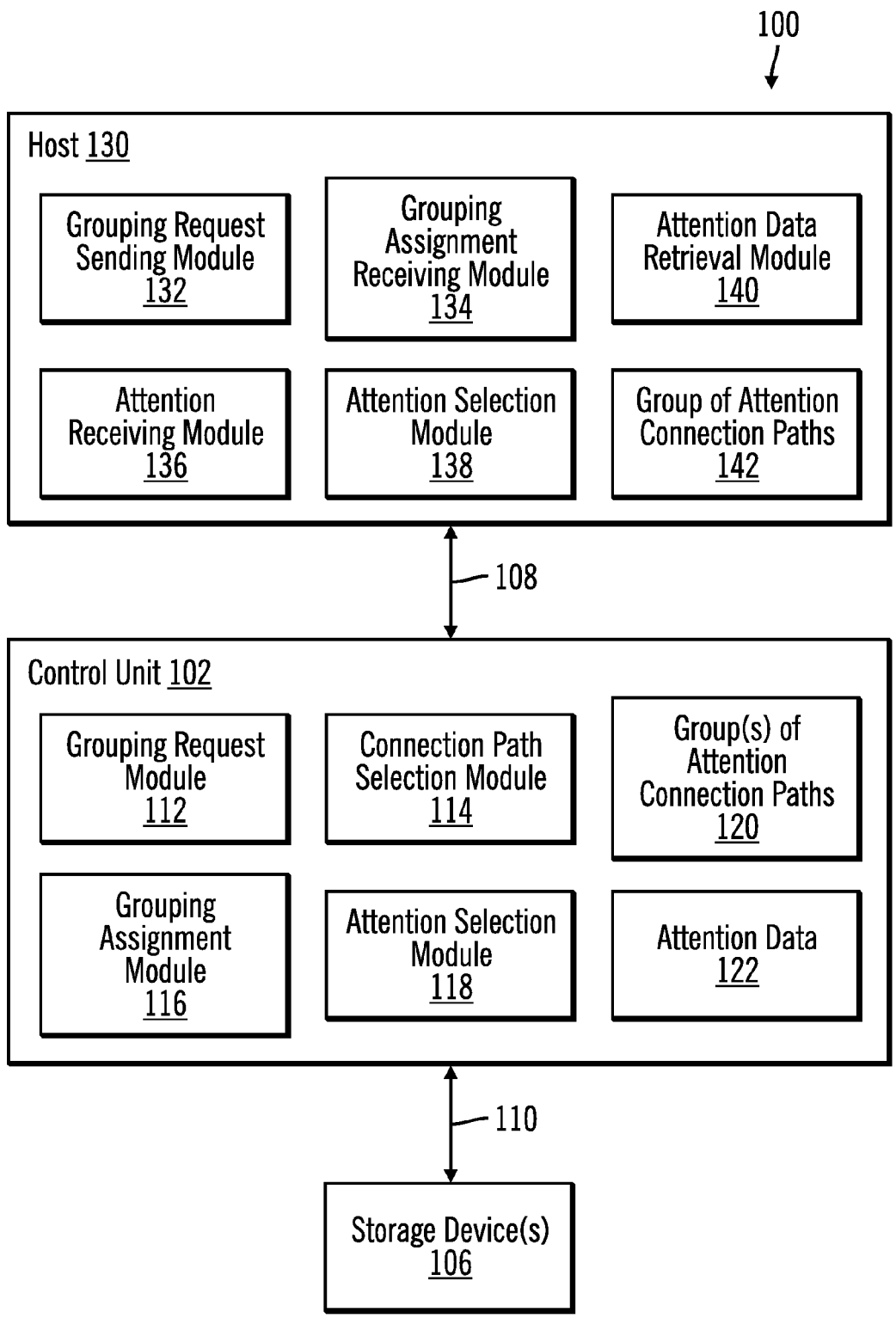
FIG. 1 illustrates details of a system for using connection paths in accordance with certain embodiments.

FIG. 1 illustrates details of a system 100 for using connection paths in accordance with certain embodiments. The system 100 includes a control unit 102 configured to communicate with one or more hosts 130 and one or more storage devices 106. The control unit 102 is configured to process requests from a host 130, or one or more processes within a host 102, to access data in a storage unit 106. The control unit 102 may be a storage controller connected to a network or a storage area network. In one embodiment, the control unit 102 is a data storage control system. In another embodiment, the control unit 102 is an Enterprise Storage Server ("ESS") manufactured by International Business Machines ("IBM") of Armonk, N.Y. One skilled in the art will recognize other embodiments of a control unit 102 that facilitates access of data on a storage device 106 by a host 130.

The host 130 reads data from and writes data to the storage device 106 through the control unit 102. The host 130 may be a mainframe computer, a server, a personal computer, or the like. In a certain embodiment, the host is an IBM mainframe computer running the z/390 or z/OS operating system. The control unit 102 accesses the data of the storage device 106 for the host 130.

In one embodiment, the host 130 processes transactions comprising data. A transaction may require that data accessed during the transaction is locked during the transaction to prevent corruption of the data. For example, a transaction involving transferring money may require that a source account and a destination account be locked to prevent access by another process until the transfer of money is complete. In one embodiment the system 100, employs IBM's Transaction Processing Facility ("TPF") operating system. The system 100 may use IBM's Multi-Path Lock Facility (MPLF) to lock data during a transaction.

In certain embodiments, MPLF commands are issued from TPF software to the control unit 102. TPF may be used for fast transactions in industries such as airline reservations, hotel reservations, and credit card transactions. TPF may be described as running in a multi-host, loosely coupled environment, where MPLF is used to lock a track (i.e., a track of a disk) or track range prior to read/write activity. These locks are held during the duration of the transaction and other hosts cannot access the track while the lock is being held. When a host attempts to get a lock which is held and cannot, the holder of the lock may get a contention attention if the holder requested being told of contention (e.g., in a Basic Connect command). The host attempting to get the lock may be made a waiter if the host requested queuing (e.g. in a Basic Connect command). A Basic Connect command may be described as a channel command word that is used by the TPF operating system to initialize a logical MPLF user. The Basic Connect command establishes a connection device and path, among other things. Later when the waiter is able to get the lock, a lock granted attention is sent to the waiter host. TPF software may use a queuing mechanism for hosts waiting on locks, and these waiters cannot continue processing until they can get their locks, and then they may perform their transactions.

The volume and channel used to drive the Perform Subsystem Function Basic Connect channel command word is designated as the connection device/path for this host 130. This connection device/path is unique in that, whereas I/O can be run from the host 130 on any path the host 130 has from a Central Processing Unit (CPU) to the control unit 102, the lock attention data returned to the host 130 from MPLF lock attentions is on this connection device/path.

The storage device 106 may be one or more hard disk drives, a redundant array of independent drives, an optical storage drive, a magnetic tape drive, a data cache, or the like. In one embodiment, the control unit 102 accesses a plurality of storage devices 106. In one embodiment, the storage device 106 may be integrated with the control unit 102.

The host 130 communicates with the control unit 102 through a connection path. Each connection path comprises at least one communication channel 108. In addition, each connection path may comprise one or more logical ports, control blocks, switches, addresses, and the like for transmitting digital messages between the host 130 and the control unit 102. In one embodiment, each communication channel 108 is configured as a physical communication channel such as a digital electronic communication bus, a digital optical communication bus, or the like. Each communication channel 108 transmits digital messages between the host 130 and the control unit 102.

The control unit 102 communicates with the storage device 106 through a storage connection path. Each storage connection path comprises at least one storage communication channel 110. In addition, each connection path may comprise one or more logical ports, control blocks, switches, addresses, and the like for transmitting digital messages between the control unit 102 and the storage device 106. In one embodiment, each storage communication channel 110 is configured as a physical communication channel such as a digital electronic communication bus, a digital optical communication bus, or the like. In another embodiment, the storage communication channel 110 comprises a storage area network. In yet another embodiment, the storage communication channel 110 is a small computer system interface ("SCSI") bus. Each storage communication channel 110 transmits digital messages between the control unit 102 and the storage device 106.

The control unit 102 stores one or more groups of connection paths 120 and attention data 122. Each group of attention connection paths 120 may be used for a different host 130. Each individual group of attention connect paths 120 is used for a same host.

The control unit 102 includes a grouping request module 112 configured to receive a request to establish a group of attention connection paths. Each attention connection path is configured to communicate lock attention interrupts and lock attention data (messages) between the host 130 and the control unit 102. That is, the connection path is used for raising the attentions to the host 130 and for the host 130 reading the attention data from the control unit 102. In one embodiment, the lock attention interrupt comprises notification to a host 130 that is a waiter that a lock on data sought by the host 130 is granted. In another embodiment, the lock attention interrupt comprises a message to a second host 130 that a first host 130 is contending for the data and that the second host 130 is made a waiter. One skilled in the art will recognize other lock attention interrupts that may be transmitted on an attention connection path.

In one embodiment, the grouping request module 112 receives a request to establish a group of attention connection paths from a host 130. The grouping request module 112 may also receive a request to establish a group of attention connection paths from the control unit 102 or through user input during an initialization process. In another embodiment, the grouping request module 112 may receive a request to establish a group of attention connection paths automatically during an initialization or other process. One skilled in the art will recognize other ways for the grouping request module 112 to receive a request to establish a group of attention connection paths.

The control unit 102 includes a connection path selection module 114 configured to select a plurality of connection paths between the host 130 and the control unit 102. The connection path selection module 114 selects connection paths that are capable of transmitting lock attention interrupts and lock attention data. In one embodiment, the connection path selection module 114 may select connection paths that are unassigned. In another embodiment, the connection path selection module 114 may select connection paths that may also be used to transmit data other than lock attention data. In yet another embodiment, the connection path selection module 114 may select connection paths that are assigned to a group. One skilled in the art will recognize connection paths that the connection path selection module 114 may select to transmit lock attention data.

The control unit 102 includes a grouping assignment module 116 configured to assign the plurality of connection paths to a group. In one embodiment, the grouping assignment module 116 creates a table that identifies connection paths to transmit lock attention interrupts and lock attention data. In another embodiment, the grouping assignment module 116 assigns a group identification to the group. In yet another embodiment, the grouping assignment module 116 notifies the host 130 that is in communication with the control unit 102 that the group has been created. In another embodiment, the grouping assignment module 116 communicates to the host 130 the connection paths in the group. One skilled in the art will recognize other ways for the grouping assignment module 116 to assign connection paths to a group.

In certain alternative embodiments, the host 130 includes a connection path selection module configured to select a plurality of connection paths between the host 130 and the control unit 102 and a grouping assignment module configured to assign the plurality of connection paths to a group. In such alternative embodiments, the host 130 may select the connection paths, form the groups, and send the group information to the control unit 102.

The control unit 102 includes an attention selection module 118 configured to select a connection path for communicating lock attention interrupts and lock attention data from any of the connection paths in the group. In one embodiment, the attention selection module 118 selects a connection path based on a load balancing function. The load balancing function may choose a connection path that is the least busy. The load balancing function may also either choose a connection path that is available to transmit lock attention interrupts and lock attention data (e.g., a functioning communication channel) or exclude connection paths that are unavailable to transmit lock attention interrupts and lock attention data. A connection path may be unavailable due to hardware failures, software failures, use of the connection path for another purposes, or the like. The load balancing function may, in one embodiment, use a combination of factors such as amount of traffic on a connection path, availability, efficiency of the connection path, or other factors to select a connection path. One skilled in the art will recognize other load balancing functions to select a connection path.

The grouping request module 112, the connection path selection module 114, the grouping assignment module 116, and attention selection module 118, in one embodiment are located in the control unit 102, but may be located in the storage device 106, in the host 130, or another computing device, or may not be located all in a single device. One skilled in the art will recognize other module locations configured to group connection paths for lock attention interrupts and lock attention data.

The host 130 includes a grouping request sending module 132 configured to send a request to establish a group of attention connection paths from the host 130 to the control unit 102. Each connection path is configured to communicate lock attention interrupts and lock attention data between the host 130 and control unit 102 via a communication channel 108. The control unit 102 is configured to communicate with the storage device 106 and access data on the storage device 106 via a storage communication channel 110.

The host 130 includes a group assignment receiving module 134 configured to receive a group of attention connection paths from the control unit 102. The control unit 102 is configured to select a plurality of connection paths configured to transmit lock attention interrupts and lock attention data between the host 130 and the control unit 102 and to assign the plurality of connection paths to a group. The host 130 stores the group of attention connection paths 142 received from the control unit 102.

The host 130 also includes, in one embodiment, an attention receiving module 136 configured to receive lock attention interrupts and lock attention data from the control unit 102 on a connection path selected from the group of attention connection paths. The connection path may be selected using a load balancing function.

The host 130 also includes an attention selection module 138 configured to select a connection path for communicating lock attention data from any of the connection paths in the group. In one embodiment, the attention selection module 138 selects a connection path based on a load balancing function. The load balancing function may choose a connection path that is the least busy. The load balancing function may also either choose a connection path that is available to transmit lock attention interrupts and lock attention data (e.g., a functioning communication channel) or exclude connection paths that are unavailable to transmit lock attention interrupts and lock attention data. A connection path may be unavailable due to hardware failures, software failures, use of the connection path for another purposes, or the like. The load balancing function may, in one embodiment, use a combination of factors such as amount of traffic on a connection path, availability, efficiency of the connection path, or other factors to select a connection path. One skilled in the art will recognize other load balancing functions to select a connection path.

The host 130 includes an attention data retrieval module 140 configured to retrieve attention data using the selected connection path.

Figure 2:
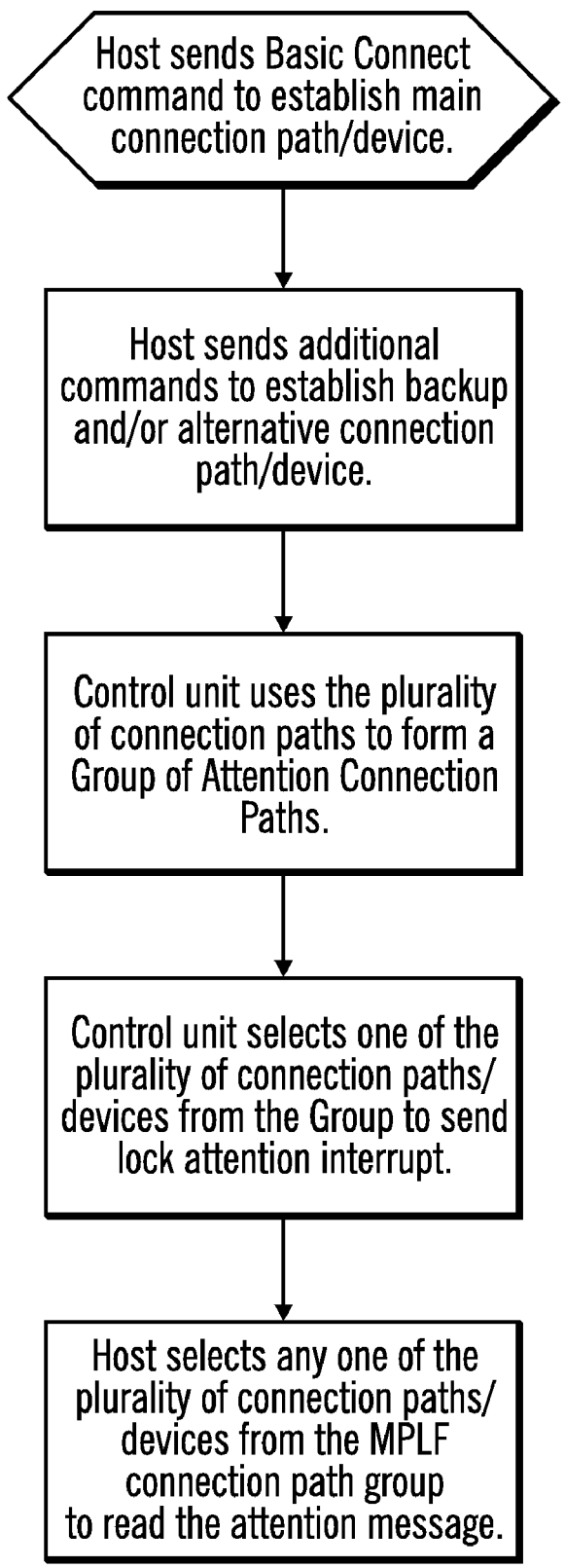
FIG. 2 illustrates interaction between a host and a control unit in accordance with certain embodiments.

FIG. 2 illustrates interaction between a host 130 and a control unit 102 in accordance with certain embodiments. Control begins at block 200 with the host 130 sending a Basic Connect command to establish a main connection path/device. In block 202, the host 130 sends additional commands to establish backup and/or an alternative connection path/device. In block 204, the control unit 102 uses the plurality of connection paths to form a group of attention connection paths (e.g., an MPLF Connection Pathgroup). In block 206, the control unit 102 selects one of the plurality of connection paths/devices from the group to send lock attention interrupt. In block 208, the host 130 selects any one of the plurality of connection paths/devices from the MPLF connection path group to read the attention message.

Figure 3:
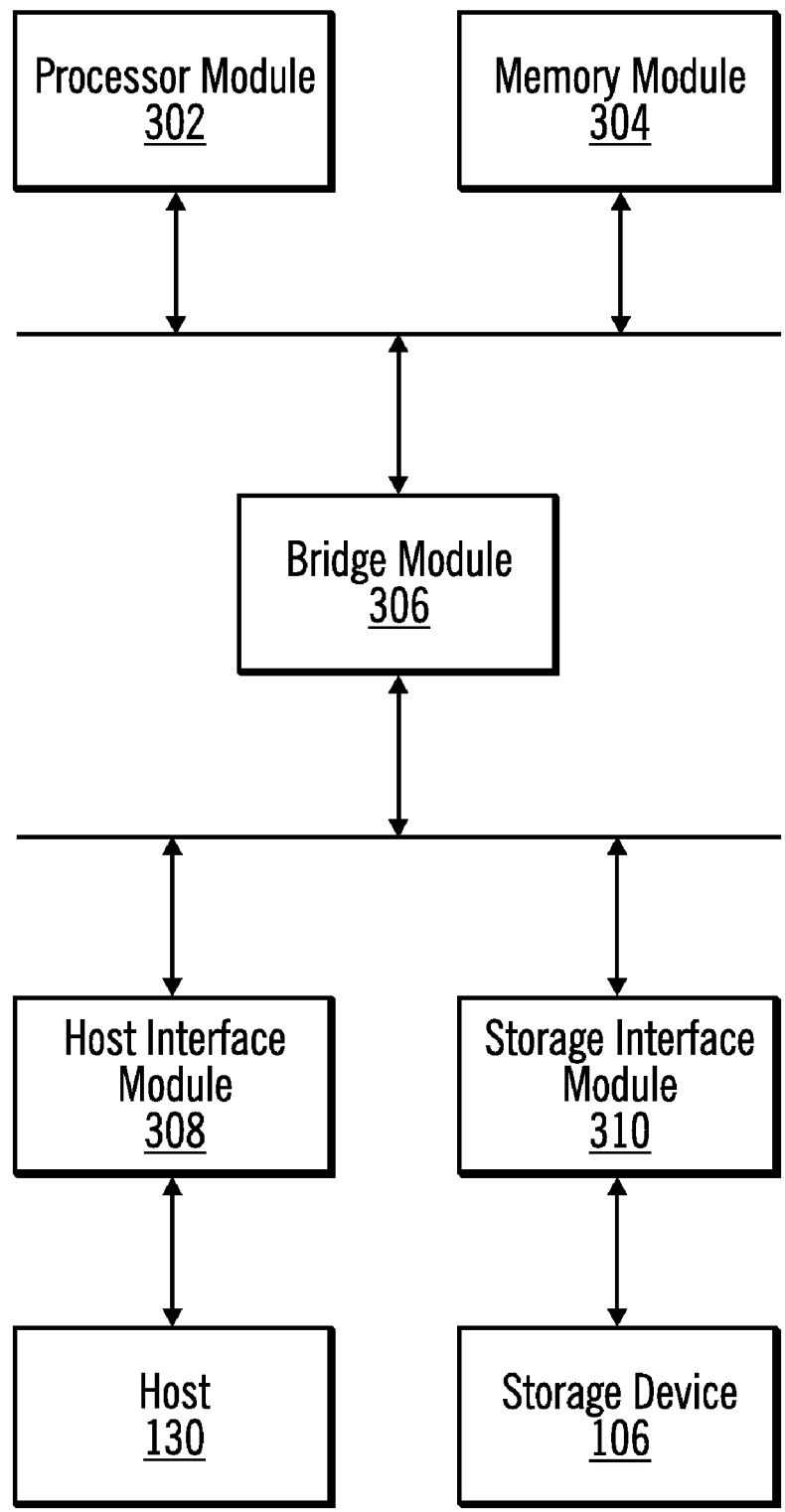
FIG. 3 illustrates details of a control unit in accordance with certain embodiments.

FIG. 3 illustrates details of a control unit 102 in accordance with certain embodiments. The control unit 102 includes a processor module 302, a memory module 304, a bridge module 306, a host interface module 308, and a storage interface module 310, a host 130, and a storage device 106.

The processor module 302, memory module 304, bridge module 306, host interface module 308, and storage interface module 310 may be fabricated of semiconductor gates on one or more semiconductor substrates. Each semiconductor substrate may be packaged in one or more semiconductor devices mounted on circuit cards. Connections between the processor module 302, the memory module 304, the bridge module 306, the host interface module 308, and the storage interface module 310 may be through semiconductor metal layers, substrate to substrate wiring, or circuit card traces or wires connecting the semiconductor devices.

The memory module 304 stores software instructions and data. The processor module 302 executes the software instructions and manipulates the data as is well know to those skilled in the art. The processor module 302 communicates with the host interface module 308 and the storage interface module 310 through the bridge module 306.

In one embodiment, the grouping request module 112, the connection path selection module 114, the grouping assignment module 116, and attention selection module 118 are software programs comprising software instruction and data executing on the processor module 302.

For example, the processor module 302 executing the grouping request module 112 may receive a request to group connection paths for lock attention interrupts and lock attention data between the control unit 102 and the host 130. In addition, the processor module 302 executing the connection path selection module 114 may select connection paths to transmit lock attention interrupts and lock attention data, and the processor module 302 executing the grouping assignment module 116 may assign the selected connection paths to a group. The processor module 302 executing the attention selection module 118 may establish a connection path between the control unit 102 and the host 130 using a load balancing function through the host interface module 308 and the communication channel 108.

Figure 4:
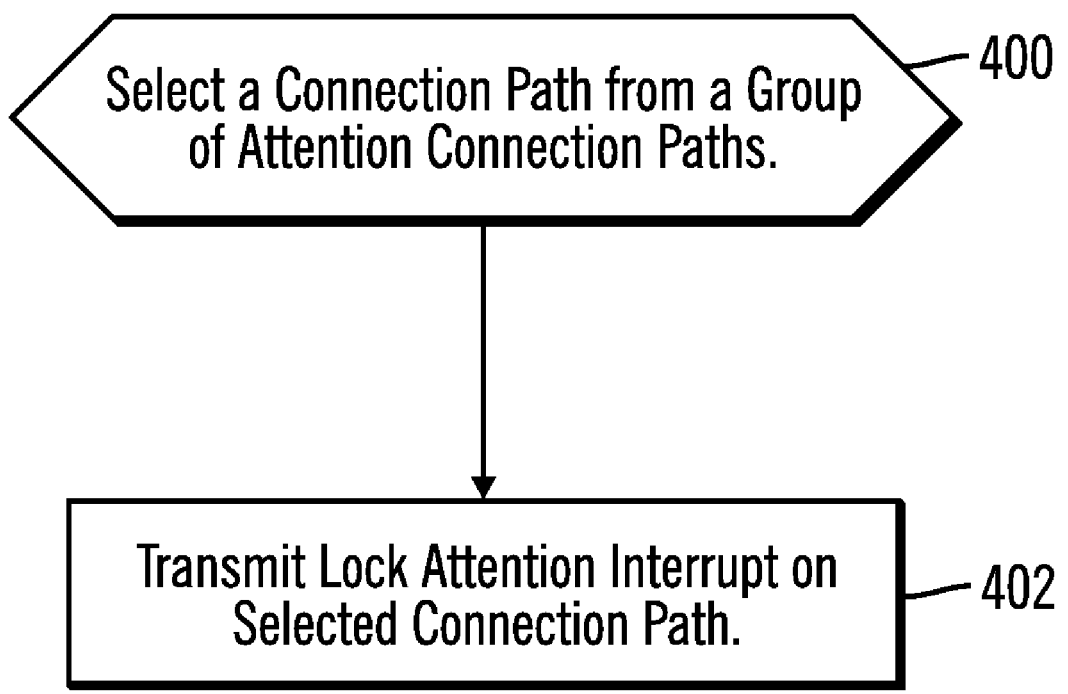
FIG. 4 illustrates logic at a control unit in accordance with certain embodiments.

FIG. 4 illustrates logic at the control unit 102 in accordance with certain embodiments. Control begins at block 400 with the control unit 102 selecting a connection path from a group of attention connection paths (i.e., which correspond to the group 142). In block 402, the control unit 102 transmits a lock attention interrupt to the host 130 on the selected connection path.

Figure 5A:
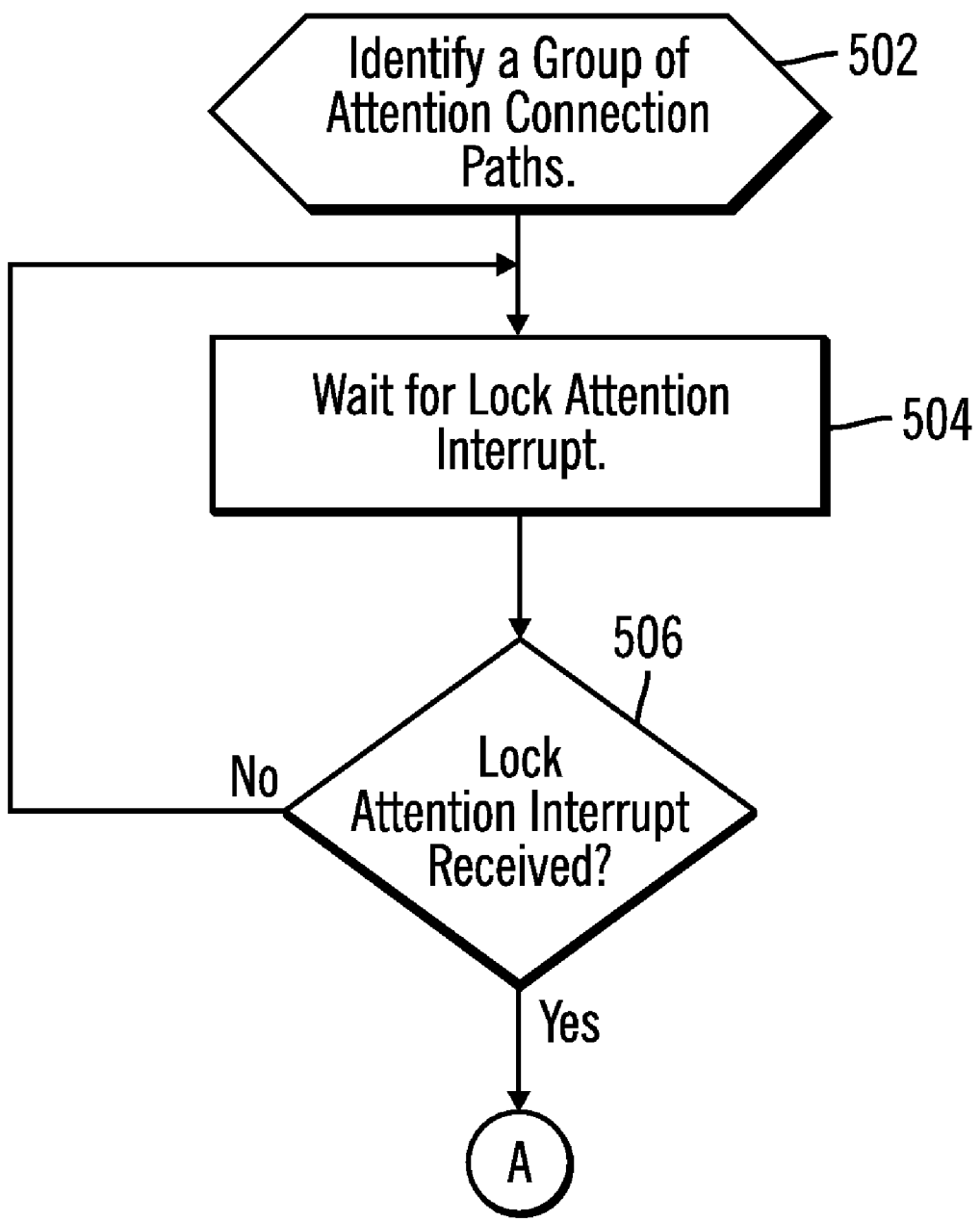
FIGS. 5A and 5B illustrate logic at the host in accordance with certain embodiments.
Figure 5B:
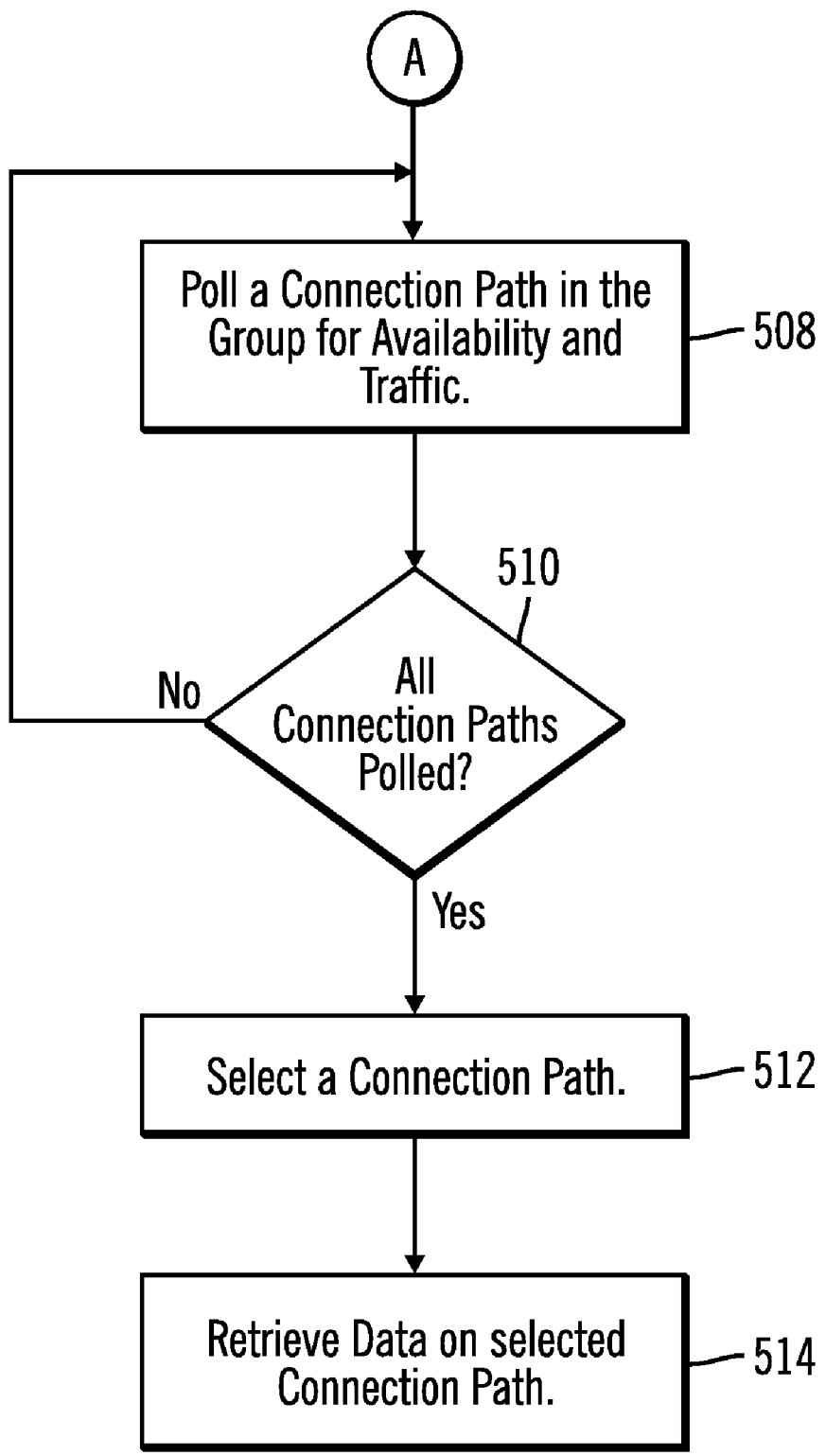

FIGS. 5A and 5B illustrate logic at the host 130 in accordance with certain embodiments. Control begins at block 502 (FIG. 5A) with the host 130 identifying a group of attention connection paths.

In certain embodiments, the identification is done by the grouping request sending module 132 at the host 130 sending a request to the grouping request module 112 to establish a group of attention connection paths configured to transmit lock attention interrupts and lock attention data. The grouping request module 112 receives the request to establish the group of attention connection paths. The connection path selection module 114 at the control unit 102 then selects a quantity of connection paths between the host 130 and control unit 102 that may be configured to transmit lock attention interrupts and lock attention data. The grouping assignment module 116 at the control unit 102 then assigns the selected connection paths to a group. In one embodiment, the grouping assignment module 116 may then notify the host 130 of the group. In another embodiment, the grouping assignment module 116 creates a table representing the group that includes the connection paths in the group, and the table is sent to the host 130. Then, the group assignment receiving module 134 receives a group of attention connection paths for lock attention interrupts and lock attention data, which are stored as group of attention connection paths 142.

In certain alternative embodiments, the identification is done by the host 130 selecting a quantity of connection paths between the host 130 and control unit 102 that may be configured to transmit lock attention interrupts and lock attention data, assigning the selected connection paths to a group, and notifying the control unit 102 of the group.

In block 504, the attention receiving module 136 waits for a lock attention interrupt. In certain embodiments, the host 130 has a single threaded queue and does not continue with read/write activity until the lock is obtained. In block 506, the attention receiving module 136 determines whether a lock attention interrupt has been received. If so, processing continues to block 508 (FIG. 5B), otherwise, processing loops back to block 504. For example, if the host 130 is made a waiter, the attention receiving module 136 may wait for a lock on data required for a transaction to be released. If a lock attention interrupt is transmitted to the host 130, the attention receiving module 136 then receives the lock attention interrupt and processing continues to block 508.

In block 508, the attention selection module 138 polls a connection path in the group of attention connection paths 142 to determine availability of the connection path and traffic on the connection path. In block 510, the attention selection module 138 determines whether all of the connection paths in the group of attention connection paths 142 have been polled. If so, processing continues to block 512, otherwise, processing loops back to block 508. If processing loops back to block 508, the attention selection module 138 polls another connection path in the group of attention connection paths 142. If the attention selection module 138 determines that there are no more connection paths in the group to be polled, the attention selection module 138 selects a connection path from the group of attention connection paths 142 to be used to retrieve lock attention data from the control unit 102 (block 512). The attention selection module 138 may select the connection path using a load balancing function. In certain embodiments, the host 130 selects a different connection path than was selected by the control unit 102 from a same group of attention connection paths. In block 514, the attention data retrieval module 140 retrieves data using the selected connection path. The retrieved data may be lock attention data 122.

Thus, with embodiments, the host 130 takes advantage of selection of a connection path from a group of attention connection paths configured to transmit attention data. Selection may use load balancing techniques. Thus, once there are one or more alternate connection paths, forming the group of attention connection paths 142, the host 130 is able to determine an optimal path within the group 142. Although the control unit 102 may have determined which path in the group of attention connection paths 142 (where group 142 corresponds to one of the groups 120) is the least busy and gives an interrupt for a lock attention to be offloaded to the host 130, this path may not be the best path for the host 130 to use to retrieve (i.e., read) the lock attention data 122. With embodiments, the host 130 is able to read the lock attention data 122 on any path in the group of attention connection paths 142.

In certain embodiments, all of the paths in one group 130 are for a particular host, which prevents lock attention messages from being returned to a wrong host, but allows the host 130 to take advantage of the benefits of path grouping. Thus, by allowing the host 130 to control the path used to read the lock attention data 122, embodiments achieve a performance boost. The host 130 is able to read lock attention data 122 faster, which allows the host 130 to perform read/write transactions even faster. This results in faster transaction times for the end user.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 4, 5A and 5B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 4, 5A, and 5B may be implemented in software, hardware, programmable and non-programmable gate array logic or in some combination of hardware, software, or gate array logic.

Figure 6:
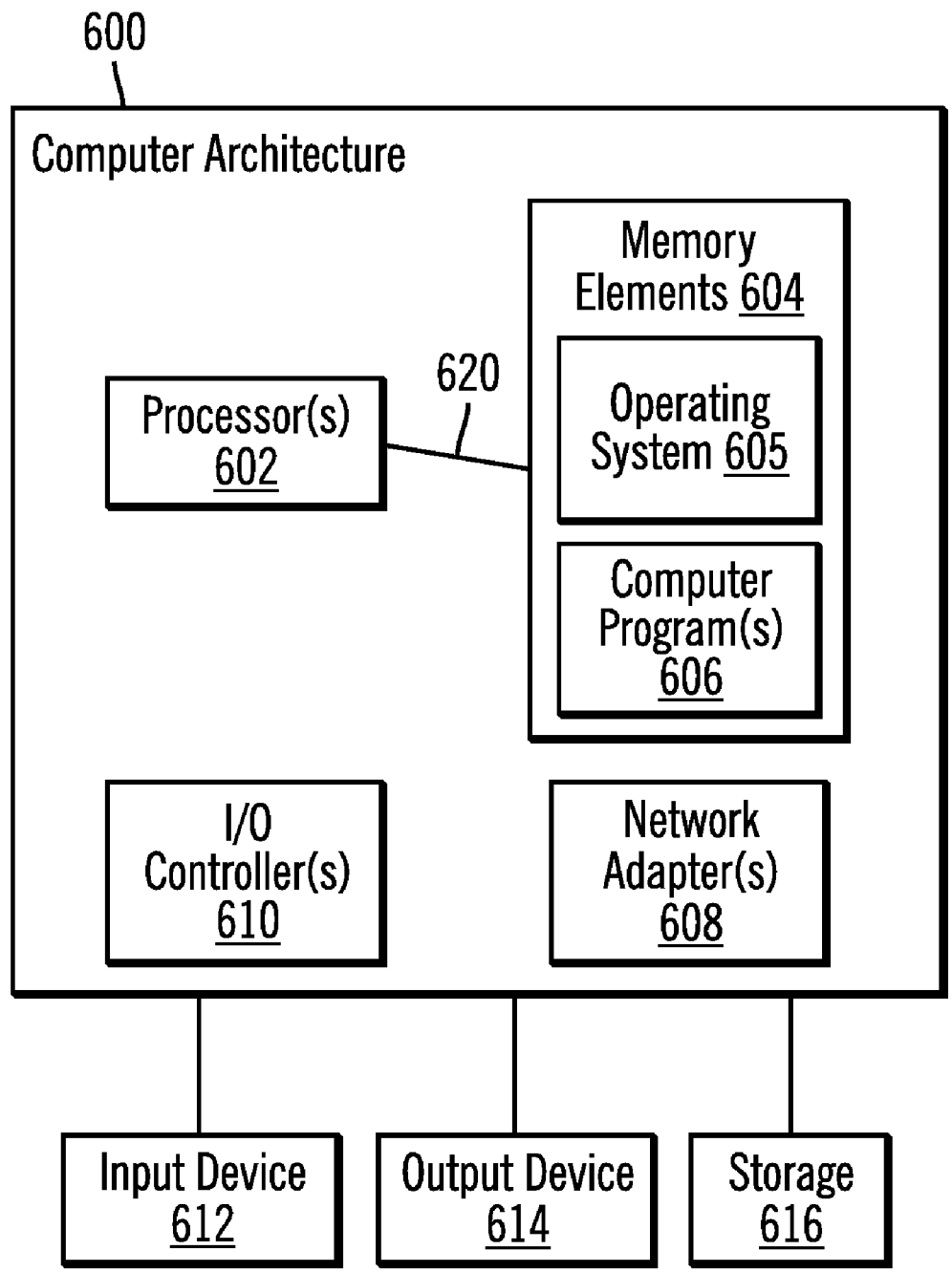
FIG. 6 illustrates a system architecture that may be used in accordance with certain embodiments.

FIG. 6 illustrates a system architecture 600 that may be used in accordance with certain embodiments. Host 130 and/or control unit 102 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A host implemented method, wherein the host is coupled to a control unit, comprising:
    under control of a control unit,
        identifying a group of attention connection paths configured to transmit lock attention interrupts and lock attention data between a host and the control unit for each of different hosts;
        storing different groups of attention connection paths for the different hosts, wherein each host is assigned one group of attention connection paths;
        selecting a first attention connection path from a first group of attention connection paths associated with a first host using a first load balancing function; and sending the first host a lock attention interrupt on the first attention connection path;
under control of the first host,
receiving the lock attention interrupt from the control unit on the first attention connection path; and
in response to receiving the lock attention interrupt,
selecting a second attention connection path from the group of attention connection paths associated with the first host using a second load balancing function; and
retrieving lock attention data from the control unit using the selected second attention connection path.

2. The method of claim 1, wherein the host identifies the group of attention connection paths and notifies the control unit of the group.

3. The method of claim 1, wherein the control unit notifies the first host of the group of attention connection paths associated with the first host.

4. The method of claim 1, wherein selecting the connection path further comprises:
polling each connection path in the group of attention connection paths for availability and traffic of that connection path.

5. The method of claim 1, wherein the first load balancing function and the second load balancing function each use a combination of factors including amount of traffic on an attention connection path, availability of an attention connection path, and efficiency of an attention connection path.

6. A method for deploying computing infrastructure, comprising integrating computer-readable code into a computing system, wherein the code in combination with the computing system is enabled to perform:
under control of a control unit,
identifying a group of attention connection paths configured to transmit lock attention interrupts and lock attention data between a host and the control unit for each of different hosts;
storing different groups of attention connection paths for the different hosts, wherein each host is assigned one group of attention connection paths;
selecting a first attention connection path from a first group of attention connection paths associated with a first host using a first load balancing function; and
sending the first host a lock attention interrupt on the first attention connection path;
under control of the first host,
receiving the lock attention interrupt from the control unit on the first attention connection path; and
in response to receiving the lock attention interrupt,
selecting a second attention connection path from the group of attention connection paths associated with the first host using a second load balancing function; and
retrieving lock attention data from the control unit using the selected second attention connection path.

7. The method of claim 6, wherein the host identifies the group of attention connection paths and notifies the control unit of the group.

8. The method of claim 6, wherein the control unit notifies the first host of the group of attention connection paths associated with the first host.

9. The method of claim 6, wherein selecting the connection path further comprises:
polling each connection path in the group of attention connection paths for availability and traffic of that connection path.

10. The method of claim 6, wherein the first load balancing function and the second load balancing function each use a combination of factors including amount of traffic on an attention connection path, availability of an attention connection path, and efficiency of an attention connection path.

11. Computer program products each comprising a computer useable medium including a computer readable program, wherein each computer readable program when executed by a processor on a computer causes the computer to:
under control of a control unit,
identify a group of attention connection paths configured to transmit lock attention interrupts and lock attention data between a host and the control unit for each of different hosts;
store different groups of attention connection paths for the different hosts, wherein each host is assigned one group of attention connection paths;
select a first attention connection path from a first group of attention connection paths associated with a first host using a first load balancing function; and
send the first host a lock attention interrupt on the first attention connection path;
under control of the first host,
receive the lock attention interrupt from the control unit on the first attention connection path; and
in response to receiving the lock attention interrupt,
select a second attention connection path from the group of attention connection paths associated with the first host using a second load balancing function; and
retrieve lock attention data from the control unit using the selected second attention connection path.

12. The computer program products of claim 11, wherein the host identifies the group of attention connection paths and notifies the control unit of the group.

13. The computer program products of claim 11, wherein the control unit notifies the first host of the group of attention connection paths associated with the first host.

14. The computer program products of claim 11, wherein selecting the connection path further comprises:
polling each connection path in the group of attention connection paths for availability and traffic of that connection path.

15. The computer program products of claim 11, wherein the first load balancing function and the second load balancing function each use a combination of factors including amount of traffic on an attention connection path, availability of an attention connection path, and efficiency of an attention connection path.

16. A system, comprising:
hardware logic capable of performing operations, the operations comprising:
under control of a control unit,
identifying a group of attention connection paths configured to transmit lock attention interrupts and lock attention data between a host and the control unit for each of different hosts;
storing different groups of attention connection paths for the different hosts, wherein each host is assigned one group of attention connection paths;
selecting a first attention connection path from a first group of attention connection paths associated with a first host using a first load balancing function; and sending the first host a lock attention interrupt on the first attention connection path;

under control of the first host,
  receiving the lock attention interrupt from the control unit on the first attention connection path; and
  in response to receiving the lock attention interrupt,
    selecting a second attention connection path from the group of attention connection paths associated with the first host using a second load balancing function; and
    retrieving lock attention data from the control unit using the selected second attention connection path.

17. The system of claim 16, wherein the host identifies the group of attention connection paths and notifies the control unit of the group.

18. The system of claim 16, wherein the control unit notifies the first host of the group of attention connection paths associated with the first host.

19. The system of claim 16, wherein selecting the connection path further comprises:
  polling each connection path in the group of attention connection paths for availability and traffic of that connection path.

20. The system of claim 16, wherein the first load balancing function and the second load balancing function each use a combination of factors including amount of traffic on an attention connection path, availability of an attention connection path, and efficiency of an attention connection path.

* * * * *